3,620,122
CONNECTOR ASSEMBLY FOR DISPOSABLE BOMB ARMING DEVICE

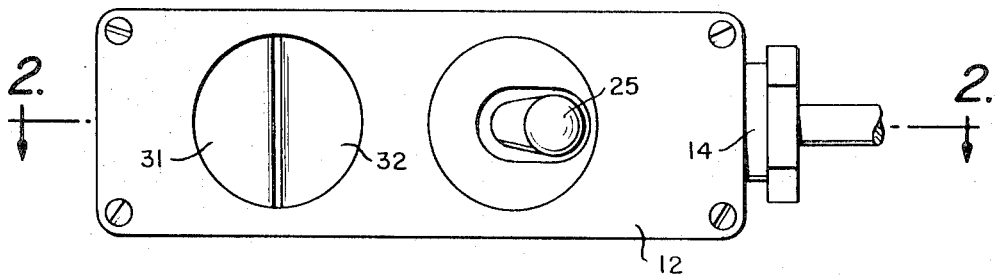
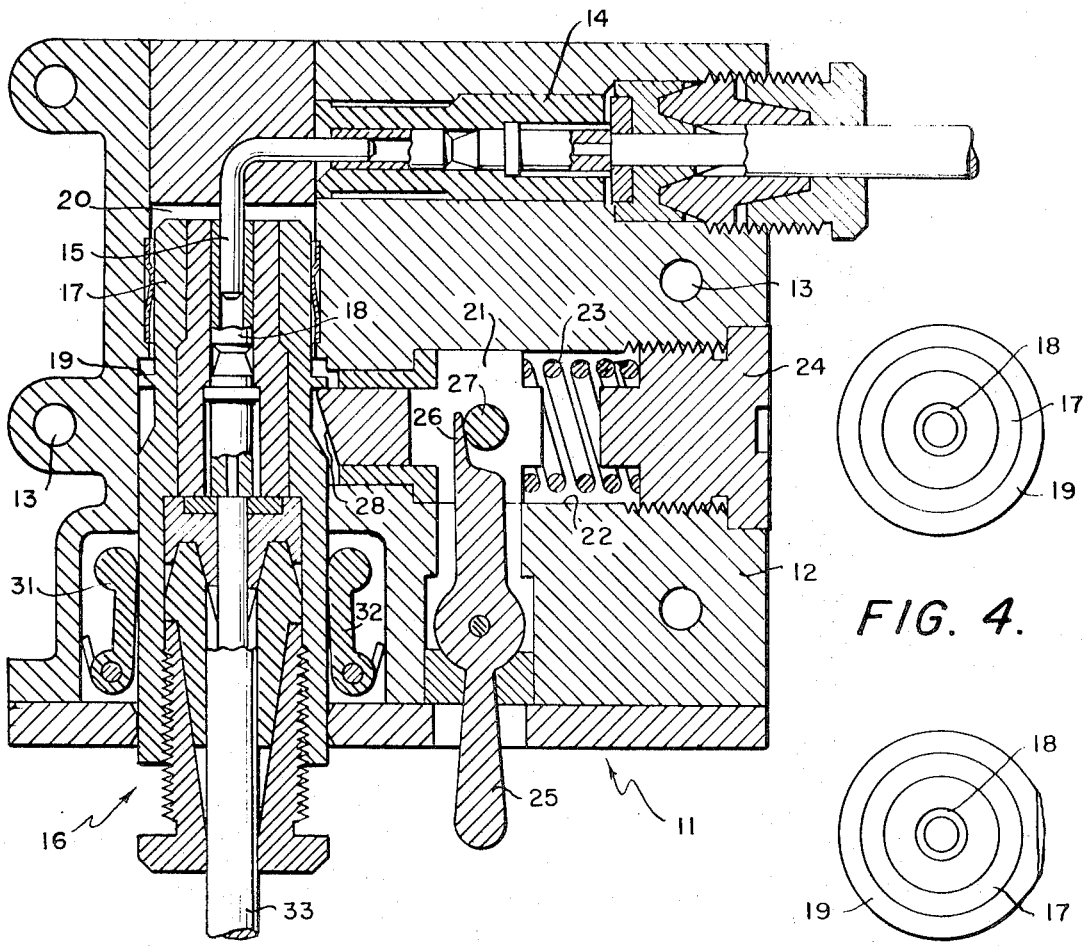
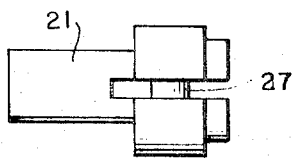

William K. Kuntz and George E. Souviner, Indianapolis, Ind., assignors to the United States of America as represented by the Secretary of the Navy
Filed Aug. 14, 1969, Ser. No. 850,147
Int. Cl. B64d 1/04
U.S. Cl. 89—1.5 D                                       1 Claim

ABSTRACT OF THE DISCLOSURE

A connector assembly having a stationarily mounted connector section with one or more connector pins and a removable connector section with one or more mating connector pins. The removable connector section is provided with a deformable locking flange and a spring-biased plunger is slidably mounted in the stationarily mounted connector section and engageable with the locking flange to lock the two connector sections together. Upon release of a bomb arming device, the locking flange is deformed or ruptured and the two connector sections are separated. A pivotal lever is provided for separating the two connector sections without deforming the locking flange.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a connector assembly and more particularly to a connector assembly for use with a bomb arming device which electrically arms a bomb or other weapon after being launched from an aircraft.

In U.S. Pat. 3,101,055, which issued Aug. 20, 1963, to applicants, there is shown and described a bomb arming device which is threadedly attached to a bomb and contains a circular channel or groove on the top that holds an arming cable. A connector is provided on the end of the arming cable and is mated to an electrical connector on the bomb rack. After the bomb is launched, a voltage is applied through the arming cable and bomb arming device to arm the bomb, and then the connector on the arming cable separates from the connector on the bomb rack. While the connector on the end of the arming cable must be separable from the connector on the bomb rack, the two connectors must fit sufficiently tight so that shock and vibration which are associated with an aircraft will not cause the connectors to prematurely separate.

One known device for assuring locking of the two connectors in a bomb arming device employs a ball and detent arrangement for providing sufficient force to prevent accidental separation. The main disadvantage to this arrangement, however, is that the connectors are difficult to separate if a bomb is not dropped and is to be manually unloaded.

SUMMARY OF THE INVENTION

The present invention provides an improved connector assembly for use with a disposable bomb arming device. A stationary connector section is provided and, in operation, will normally be attached to a bomb rack, and a removable connector section is engageable with the stationary connector section. A thin, deformable locking flange is provided around the outer circumference of the removable connector section. A spring-biased plunger is slidably mounted in the stationary connector section and is engageable with the locking flange to prevent easy removement of the removable connector section from the stationary connector section. A very strong force on the removable connector section, however, such as that applied by an arming cable during a bomb drop, will cause the thin locking flange to deform, or rupture, and the two connector sections will separate. A pivotable release lever is engageable with the plunger to withdraw the plunger from contact with the locking flange, and the removable connector section can readily be separated from its mating connector section.

BRIEF DESCRIPTION OF THE DRAWING

FIG. 1 is a top view showing a stationary connector section;

FIG. 2 is a sectional view taken on line 2—2 of FIG. 1 and also showing, in section, a removable connector;

FIG. 3 is a top view of a locking plunger;

FIG. 4 is an end view of a removable connector; and

FIG. 5 is an end view of a removable connector that has been deformed by removing with force from a stationary connector section.

DESCRIPTION OF THE PREFERRED EMBODIMENT

Referring now to the drawing, there is shown a stationary connector section 11 having a housing 12 which, by way of example, might be attached to a bomb rack by bolts which pass through holes 13. A connector wire and pin assembly 14 is positioned within housing 12 and has one connector pin 15 positioned within a receiving bore 20. It should be understood, of course, that additional connector pins 15 could be employed, if desired, as is well-known in the connector art.

A removable connector section 16 having an outer shell 17 slidably fits in receiving bore 20 of housing 12, and section 16 has a connector pin 18 which mates with connector pin 15. A thin locking flange 19 is provided around the periphery of outer shell 17 to lock section 16 with section 11, as will be more fully hereinafter described. A plunger 21 is slidably mounted in bore 22 in housing 12 and a spring 23 is provided to bias plunger 21 inwardly toward connector section 16. An adjusting screw 24 is provided to regulate the amount of force applied by spring 23 and also to retain plunger 21 and spring 23 in position within housing 12. A release lever 25 is pivotally attached to housing 12 and release lever 25 has a tang 26 which engages pin 27 in plunger 21. As best shown in FIG. 2 of the drawing, the forward end of plunger 21 is provided with a tapered surface 28 that facilitates the insertion of section 16 into section 11. A pair of spring-biased doors 31 and 32 are provided in housing 12 to prevent the entrance of dirt and moisture when connector section 16 is not attached with connector section 11.

OPERATION

In operation, connector section 11 might be attached to a bomb rack, and wire and pin assembly 14 is connected to a source of voltage through appropriate switches. Prior to the launch of a bomb, or other weapon, removable connector section 16 is engaged with connector section 11, with connector pins 15 and 18 being engaged as shown in FIG. 2 of the drawing. The arming cable 33 is attached to a disposable bomb arming device, such as the one shown in applicants' U.S. Pat. 3,101,055, which issued Aug. 20, 1963. As plunger 21 extends past the outer diameter of locking flange 19, plunger 21 causes connector section 16 to be locked to connector section 11. In the event that it is desired to remove connector section 16 from connector section 11, release lever 25 is pivoted thereby causing plunger 21 to compress spring 23 whereby the end of plunger 21 is cleared from the path of travel of locking flange 19 and section 16 can readily be withdrawn.

During the launch of a bomb, or other weapon the disposable bomb arming unit, and consequently arming cable 33, are attached to the weapon to be dropped. Upon release of the weapon, a strong force is applied to arming cable 33 which causes the thin locking flange 19 to be deformed, as shown in FIG. 5 of the drawing, and connector section 16 is withdrawn from connector section 11. By choice of material and thickness for locking flange 19, the force required to deform locking flange 19 can be controlled. For example, by making outer shell 17 and locking flange 19 out of commercial brass and with flange 19 having a thickness of 0.020 inch, a force of about 60 pounds will be required to deform flange 19 and withdraw connector section 16 from connector section 11.

We claim:

1. A break-away connector assembly for a disposable bomb arming device comprising:

a stationary connector section adaptable for mounting to a bomb rack and having a receiving bore with at least one connector pin therein, a removable connector section engageable in said receiving bore and having at least one connector pin engageable with said at least one connector pin of said stationary connector section and having an arming cable electrically connected to said connector pin in said removable connector section, said removable connector section having a deformable locking flange around the periphery thereof, said flange having a thickness less than 0.021 inch, a spring-biased plunger slidably positioned in said stationary connector section and engageable with said deformable locking flange to retain said removable connector section with said stationary connector section until a force is applied to said arming cable which is sufficiently strong to deform said locking flange and separate said connector sections, and a release lever pivotally mounted to said stationary connector section and engageable with said plunger whereby said plunger can be withdrawn from engagement with said locking flange without deforming said locking flange.

References Cited

UNITED STATES PATENTS

| | | | |
|---|---|---|---|
| 707,516 | 8/1902 | Klein | 339—43 |
| 2,270,993 | 1/1942 | Clark | 339—75 |
| 2,939,102 | 5/1960 | Johnson | 339—75 X |
| 3,042,891 | 7/1962 | Navarro | 339—91 X |
| 3,101,055 | 8/1963 | Kuntz et al. | 89—1.5 D X |
| 3,285,132 | 11/1966 | McCurdy | 89—1.5 D |

SAMUEL W. ENGLE, Primary Examiner

U.S. Cl. X.R.

339—43, 91